Sept. 28, 1954 W. HAUER 2,690,478

CIRCUIT ARRANGEMENT FOR COMMUNICATION SYSTEMS, IN PARTICULAR PRIVATE AUTOMATIC TELEPHONE BRANCH EXCHANGES

Filed May 9, 1952 3 Sheets-Sheet 1

Sept. 28, 1954 W. HAUER 2,690,478
CIRCUIT ARRANGEMENT FOR COMMUNICATION SYSTEMS, IN PARTICULAR
PRIVATE AUTOMATIC TELEPHONE BRANCH EXCHANGES
Filed May 9, 1952 3 Sheets-Sheet 2

Patented Sept. 28, 1954 2,690,478

UNITED STATES PATENT OFFICE 2,690,478

CIRCUIT ARRANGEMENT FOR COMMUNICATION SYSTEMS, IN PARTICULAR PRIVATE AUTOMATIC TELEPHONE BRANCH EXCHANGES

Werner Hauer, Berlin-Lichterfelde-Ost, Germany, assignor to International Standard Electric Corporation, New York, N. Y., a corporation of Delaware Application May 9, 1952, Serial No. 287,006

Claims priority, application Germany May 10, 1951

4 Claims. (Cl. 179—18)

The invention relates to a circuit arrangement for communication systems, in particular telephone systems where the extensions are connected to a link circuit by means of relays. In such systems, the application of the call-ringing voltage to the called subscriber involves difficulties because the calling and called parties are connected in parallel to the link circuit and because in applying the call-ringing condition the ringing current must be prevented from reaching the calling extension.

With a known arrangement, there is provided for this purpose an individual relay per extension ahead of the branching point to the link circuit, which, after the desired extension has been dialed, sends the ringing current to the called extension at the periodical call ringing rate, and which is deenergized by the ring cut-out when the extension has answered. With another known arrangement, the called extension is connected at first to a special link circuit, for instance, an already existing "inquiry" path, and connection with the link circuit seized by the calling extension takes place only when the called extension has answered. Even this known arrangement requires individual connecting means in order to make possible a connection of the extensions with the particular link circuit. The cost increases as more link circuits are provided.

The invention avoids the drawbacks of the known arrangements, and achieves this by the device that a connection between two extensions passes over two connecting lines assigned to each link circuit, and that the connecting means and further common switching means are arranged in a way that when a call circuit is set up to an extension higher in order, the calling extension, after dialing is completed, is connected with the one connecting line, while the called extension is connected with the other connecting line, and that in setting up calls with extensions lower in order the two extensions are connected in the reverse manner with the two connecting lines. This invention makes it possible for the call-ringing current to reach only the called extension, without the use of individual relays for each extension for this purpose, and without the necessity of putting up with limitations from the angle of system operation. The cost of the local or inquiry path circuits of such systems can thus be kept very small.

Figure 1:
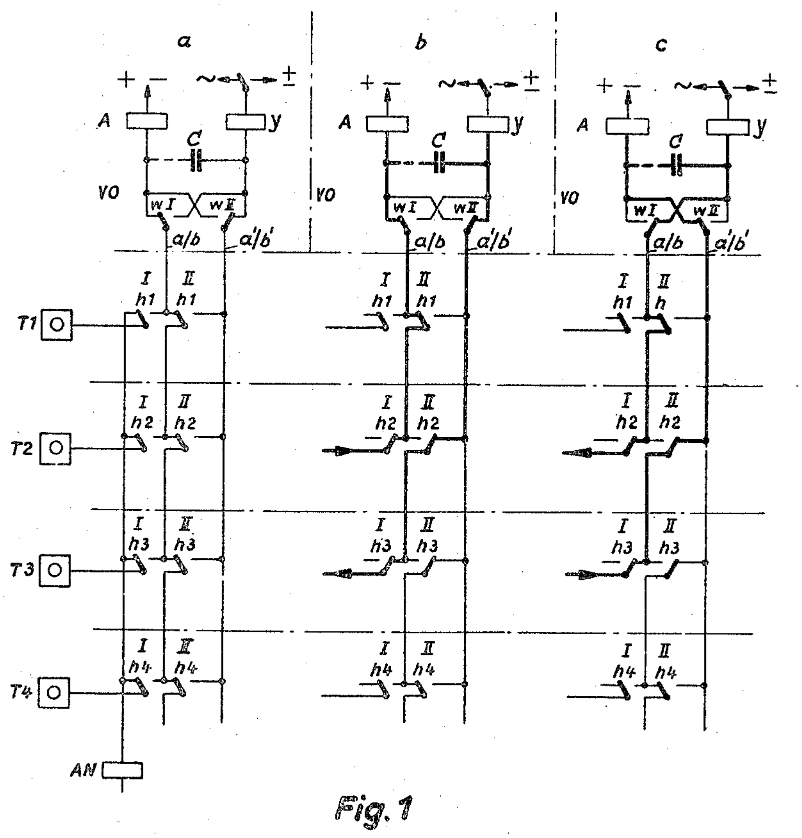
Figure 2:
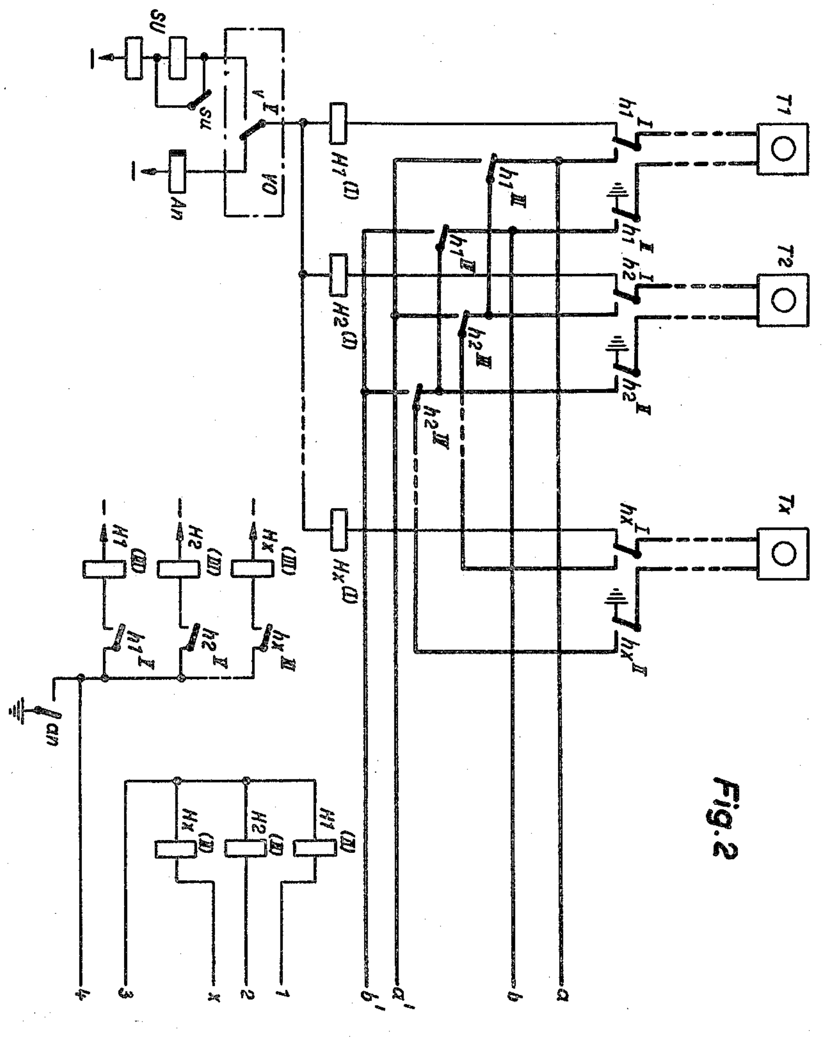
Figure 3:
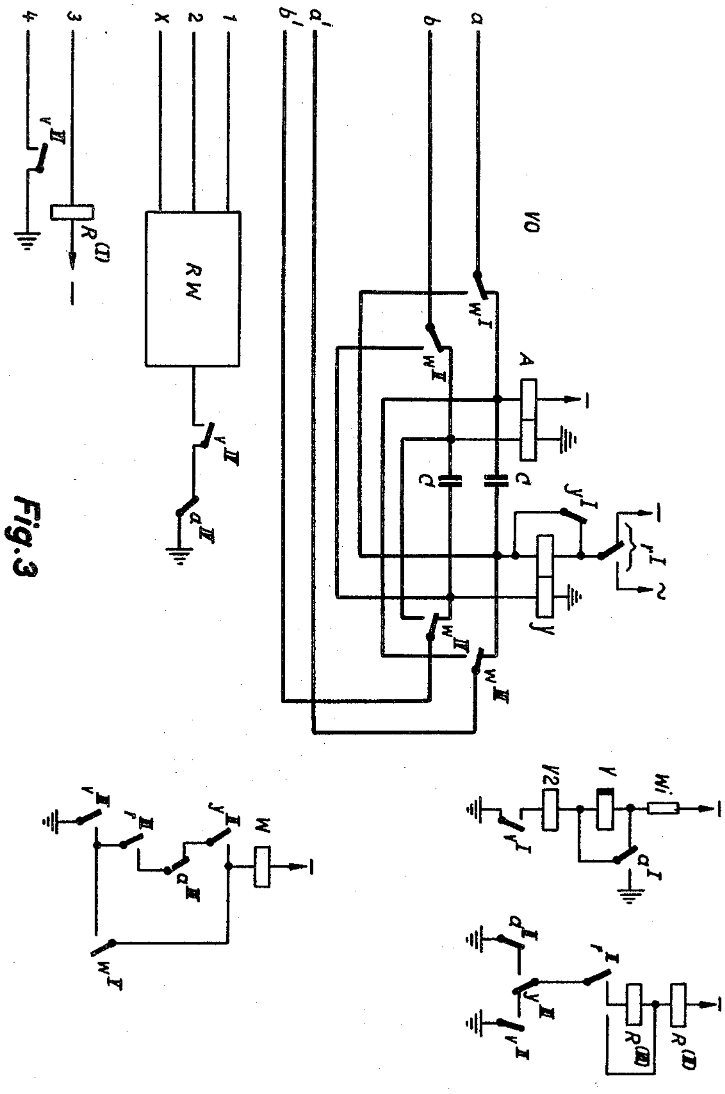

In the following, the invention will be particularly described with reference to the embodiments represented in the accompanying drawing and in which:

Fig. 1 shows the circuit diagram of a small P. A. B. X- installation operating on an all-relay basis, and Figs. 2 and 3 show such a relay-operated exchange together with its switching particulars.

Fig. 1 of the aforesaid drawing shows in a simplified single-wire representation a small private automatic telephone branch exchange on an all-relay basis with four extensions and one intercommunication or inquiry path. There are shown only those circuits which are required for an understanding of the invention. There has been omitted, for instance, the arrangement of the individual connecting relays H1 . . . 4, and there are merely shown the connecting contacts of these relays for the common communication path VO. The circuit arrangement is shown in three phases *a*, *b*, *c*. Phase *a* shows the system at rest, phase *b* shows the system with a call extended from station T2 to station T3, and phase *c* conversely a connection originated at T3 and directed to the station T2. The action of the system is as follows:

Let us assume at first that the extension T2 desires a call circuit with an extension following in order, for instance, T3. When the handset is lifted at extension T2, the connecting relay H2 (not shown) of this extension energizes in a manner not shown after the starting relay AN has been energized, to connect the extension to the connecting wire *a*/*b* of the communication path VO over its contact *h*2I, while contact *h*2II disconnects the subscribers arranged ahead and connects the extensions following in order to the second connecting line *a'*/*b'*. Extension T2 thus is connected to the pulse-repeating and feed relay A of the communication path, while the extensions following in the row are connected preparatorily to the feed relay Y of the communication path over which the call ringing is effected. The subscriber proceeds now to dial the digit 3 in order to call the extension T3. This pulse series is received by the pulse relay A and repeated in a manner not shown to an all-relay switch. After completed dialing, the setting of the all-relay switch energizes the connecting relay of extension T3 in a manner not shown which transfers its contacts *h*3I and *h*3II. In the link circuit, call-ringing current is applied to the Y relay and thus to the connecting line *a'*/*b'*, which by way of the contacts *w*II, *h*2II and *h*3I reaches the extension T3. When the subscriber T3 has answered the call, the circuit is through-connected by way of the capacitor C in the known manner (not shown). This situation is denoted in the figure by stage *b*. The completed circuit is made prominent by heavier lines. It runs by way of T2, *h*2I, *h*1II, *a*/*b*, *w*I, C, *w*II, *a'*/*b'*, *h*2II, *h*3I, T3. The calling extension receives talking battery by way of the relay A, the called extension by way of relay Y. When both relays restore as the handsets are replaced at both extensions, the normal position (stage *a*) of the system is restored.

Let us now assume that extension T3 is the calling, extension T2 the called station, or in other words, that the calling extension desires an extension higher in order. By lifting the handset of an extension T3, the connecting relay H3 is energized by way of the starting relay, which connects the subscriber T3 first, as described above, with the starting line *a*/*b*, while again the extensions following in order (T4) are connected preparatorily to the second connecting line.

By dialing the digit 2, the connecting relay H2 is energized by way of the all-relay switch, and at the same time there is energized in this case a relay W (not shown) of the link circuit VO which, by means of its contacts *w*I and *w*II, crosses the connecting lines *a*/*b* and *a'*/*b'*. As shown in stage *c* of the drawing, this crossing connects the calling subscriber T3 with the feed relay A, extension T2 with the feed relay Y of the link circuit. The call ringing circuit thus reaches the subscriber by way of relay Y over the contacts *w*I, *h*1II, *h*2I to extension T2. When the called subscriber has answered, the extension is through-connected over condenser C, as indicated in condition *c* in which the completed circuit is again emphasized by heavier lines. When the handsets are replaced at both extensions, the system returns to normal and the situation *a* is restored.

Now the following is a description of Figs. 2 and 3, representing a small type private automatic telephone branch exchange operating on an all-relay basis, similar to the one of Fig. 1 and showing its switching particulars. The designations of the respective relays and of their contacts are identical to those shown and described in Fig. 1. As far as the employed relays exhibit several windings, these are differentiated by roman letters, inserted in brackets. In opposition to Fig. 1 only three subscribers' stations are represented, e. g. T1, T2 and T*x*.

The function is as follows:

First of all there will be described the establishment of a connection from substation T1 to substation T2, hence to a subscriber's station subordinated in the successive order. When lifting the handset at subscriber's station T1, relays H1 and A*n* pull up in the following circuit: plus, *h*1II, T1, *h*1I, H1(I), *v*V, A*n*, minus.

For relay H1 the following holding circuit will be established: plus, *an*, *h*1V, H1(III), minus.

Contact *h*1V is made before contacts *h*1I and *h*1II switch-over. Due to the switching-over of the lastmentioned contacts a circuit for relay A of the connecting stage VO, Fig. 3, will be established in the following circuit: plus, A, *w*II, *b*-wire, *h*1II, T1, *h*1I, *a*-wire, *w*I, A, minus.

Prior to the de-energization of the slow-releasing relay A*n*, relay V pulls up in the circuit: plus, *a*I, V, W*i*, minus, and maintains the energization of relay H1 with its contact *v*VI. Hence, subscriber's station T1 has been connected to the connecting stage VO via the wires *a*, *b*. Now T1 dials the number 2 for calling the subscriber's station T2, whereby time pulse relay A receives two current pulses. Said current pulses are transferred via contacts *a*IV and *v*IV to all-relay selector RW, represented in Fig. 3 as a rectangle. After the termination of the train of current pulses relay H2 is energized via its winding II in a conventional and therefore not particularly represented manner over line 2. In this circuit also relay R of the connecting stage VO will be energized via its winding I and holds itself in the circuit: plus, *v*II, *y*III, *r*II, R(III), R(II), minus.

The short-circuit of winding RIII provides this relay with a slow release. Relay H2 which has been energized via the all-relay selector RW, holds itself in the circuit: plus, *v*VI, *h*2V, H2(III), minus, continuously.

By way of contact *r*I the ringing current for the subscriber's station T2 will be transmitted over the following path: *r*I, *y*I, *w*III, *a'*-wire, *h*1III, *h*2I, T2, *h*2II, *h*1IV, *b'*-wire, *w*IV, Y, plus.

If the called subscriber answers, and if a loop circuit has been established at the subscriber's station T2, then relay Y of the connecting stage VO is energized in the last-mentioned ringing circuit and cancels with its contact *y*I the short-circuit of the one winding of relay Y. The holding circuit for relay R will be opened by contact *y*III, because also contact *a*II is in a reversed position. The two telephone stations T1 and T2 are connected to each other via the connecting stage VO, whereby substation T1 is being supplied by relay A and substation T2 by relay Y.

If in the present condition the handset of another extension is lifted, then relay A*n* is prevented from pulling up because of being disconnected by contact *v*V. But in the loop circuit of this subscriber's station a buzzer relay SU pulls up, being highly resistive to such an extent, that relay H of one of the calling subscriber's stations cannot respond. Said buzzer relay SU provides the subscriber with the busy tone, indicating at the same time the busy condition of connecting stage VO.

The release of the connection is carried out by a called and calling party release, i. e. when replacing the handsets at the substations T1 and T2. In this case relays A and Y are de-energized and, on account thereof, also the remaining relays will return to normal.

The following is a description of setting up a connection between subscriber's station T*x* and subscriber's station T1, viz. a connection proceeding from the calling substation to a preordinated substation. If the subscriber at substation T*x* lifts the handset, then relays H*x* and A*n* are energized in the loop circuit. A holding circuit for relay H*x* will be established via the contact *an*. As described in the foregoing, the substation T*x* will be connected to the connecting stage VO via the wires *a*, *b*, so that relay A of the connecting stage will be energized and, thereby, also causes relay V to pull up. If the subscriber of substation Tx now dials number 1 for the purpose of calling substation T1, then relay H1 will be caused to pull up via all-relay selector RW. Substation Tx is being switched off by contacts h1III and h1IV from the input a, b of the connecting stage VO, to the input a', b' of the connecting stage VO, so that relay Y will be energized whilst relay A drops off. This will occur as a result of relay W pulling up in the following circuit: plus, vIII, rIII, aIII, yII, W, minus.

Relay W continues to hold itself via the contacts vIII and wV. By means of contacts wI to wIV, the battery supply relay Y will be connected to input a, b and battery supply relay A to input a', b' of the connecting stage VO. As a result, relay Y drops off, whilst relay A will be energized again in the following circuit: plus, A, wIV, b'-wire, h1IV, h2IV, hxII, Tx, hxI, h2III, h1III, a'-wire, wIII, A, minus.

The called substation T1 is being called in the following circuit: rI, yI, wI, a-wire, h1I, T1, h1II, b-wire, wII, Y, plus.

At an answering of substation T1, relay Y will be energized in the last-mentioned circuit and relay R will be released, whereby the connection between the subscribers Tx and T1 is established.

The release of the connection is carried out by replacing the handsets at both of the substations concerned.

While I have described above the principles of my invention in connection with specific apparatus, it is to be clearly understood that this description is made only by way of example and not as a limitation to the scope of my invention, as set forth in the objects thereof and in the accompanying claims.

What is claimed is:

1. A telecommunication system comprising a plurality of subscriber stations arranged in a predetermined order, first and second linking circuits for said stations, a common start circuit normally connected to all said subscriber stations, starting means connected to said start circuit and adapted to operate when a call originates from any of said subscriber stations, means controlled by the operation of said starting means in response to a call from a station for connecting said calling station to said first linking circuit, settable means connected to said first linking circuit adapted to be set in response to dialled impulses from said calling station for connecting a called station to said second linking circuit if said called station is subsequent to said calling station in said predetermined order and for connecting said called station to said first linking circuit and transferring the connection of said calling station from said first linking circuit to said second linking circuit if said called station precedes said calling station, means for generating ringing current, means for connecting said generating means to said second linking circuit, means controlled by said settable means for reversing the connections between said linking circuits and said settable means and said ringing current generating means if the calling line is subsequent to the called line in said predetermined order, and means for conducting talking current between said linking circuits.

2. A telecommunication system, as claimed in claim 1, in which each switching means is a relay and the connection reversing means is a relay.

3. A telecommunication system comprising a plurality of subscriber stations arranged in a predetermined order, a common starting circuit for said stations, starting means connected to said circuit adapted to operate when a call is initiated from any station, first and second linking circuits for said stations, said first linking circuit comprising a plurality of separate sections, switching means at each station normally connecting said station to said starting circuit and normally connecting the section of said first linking circuit immediately preceding said station with the section immediately following said station, means responsive to the operation of said starting means at the initiation of a call for operating said switching means to break the connection between the station initiating said call and said starting circuit and the connection between the preceding and succeeding sections of said first linking circuit and to connect said station with the preceding section of said first linking circuit and to connect the succeeding sections of said first linking circuit with said second linking circuit, settable means connected to the section of said first linking circuit preceding the first station adapted to be selectively set in response to dialled impulses received from a calling station for operating the switching means at a called station, means for generating ringing current, means for connecting said ringing current generating means to said second linking circuit, cross-over switching means for reversing the connections between said settable means and said ringing-current-generating means and said first and second linking circuits, means controlled by the setting of said settable means for operating said cross-over switching means when a station is called which precedes the calling station, and means for conducting talking currents between said first and second linking circuits.

4. A telecommunication system, as claimed in claim 3, in which the switching means at each station is a relay having two armatures, one connected to said station and connecting said station over a back contact to the common starting circuit and over a front contact to the preceding section of the first linking circuit, and the other armature connected to the succeeding section of said first linking circuit and connecting said succeeding section to a preceding section over a back contact and to the second linking circuit over a front contact.

References Cited in the file of this patent

UNITED STATES PATENTS

| Number | Name | Date |
|---|---|---|
| Re. 16,293 | Richardson | Mar. 16, 1926 |
| 1,789,606 | Stehlik | Jan. 20, 1931 |
| 1,850,192 | Willis | Mar. 22, 1932 |
| 2,420,446 | Powell | June 18, 1946 |